United States Patent
Thomsen et al.

(10) Patent No.: US 10,927,886 B2
(45) Date of Patent: Feb. 23, 2021

(54) SLIDING BEARING PAD SUPPORT

(71) Applicant: Siemens Gamesa Renewable Energy A/S, Brande (DK)

(72) Inventors: Kim Thomsen, Skørping (DK); Niels Karl Frydendal, Herning (DK); Morten Thorhauge, Aarhus (DK)

(73) Assignee: Siemens Gamesa Renewable Energy A/S

( * ) Notice: Subject to any disclaimer, the term of this patent is extended or adjusted under 35 U.S.C. 154(b) by 0 days.

(21) Appl. No.: 16/492,478

(22) PCT Filed: Jan. 2, 2018

(86) PCT No.: PCT/EP2018/050035
§ 371 (c)(1),
(2) Date: Sep. 9, 2019

(87) PCT Pub. No.: WO2018/166660
PCT Pub. Date: Sep. 20, 2018

(65) Prior Publication Data
US 2020/0011372 A1  Jan. 9, 2020

(30) Foreign Application Priority Data
Mar. 16, 2017  (DE) .......................... 10 2017 204 410

(51) Int. Cl.
*F16C 17/03* (2006.01)
*F16C 17/06* (2006.01)
(Continued)

(52) U.S. Cl.
CPC .............. *F16C 17/03* (2013.01); *F16C 17/06* (2013.01); *F16C 23/02* (2013.01); *F16C 32/0666* (2013.01); *F16C 33/08* (2013.01)

(58) Field of Classification Search
CPC .......... F16C 17/03; F16C 17/06; F16C 17/26; F16C 23/02; F16C 32/0666; F16C 32/0674; F16C 33/08; F16C 41/02
(Continued)

(56) References Cited

U.S. PATENT DOCUMENTS 3,004,804 A  10/1961  Pinkus et al.
3,799,628 A * 3/1974  Van Gaasbeek ...... F04B 1/2042
                                                                   384/12

(Continued)

FOREIGN PATENT DOCUMENTS

CN    104653598 A    5/2015
CN    105339688 A    2/2016
(Continued)

OTHER PUBLICATIONS

International Search Report and the Written Opinion of the International Searching Authority dated Jan. 2, 2018 or Application No. PCT/EP2018/050035.
(Continued)

*Primary Examiner* — Marcus Charles
(74) *Attorney, Agent, or Firm* — Schmeiser, Olsen & Watts LLP

(57) ABSTRACT

The invention relates to a support of a bearing pad of a sliding bearing.
Provided is a bearing pad support connection including a bearing pad and a bearing pad support, whereby the bearing pad is connected to the bearing pad support by a pivot joint. The pivot joint includes a pivot pocket, and a pivot.
The pivot pocket includes a sealing that abuts on the pivot of the pivot joint.

11 Claims, 1 Drawing Sheet

Figure 1:
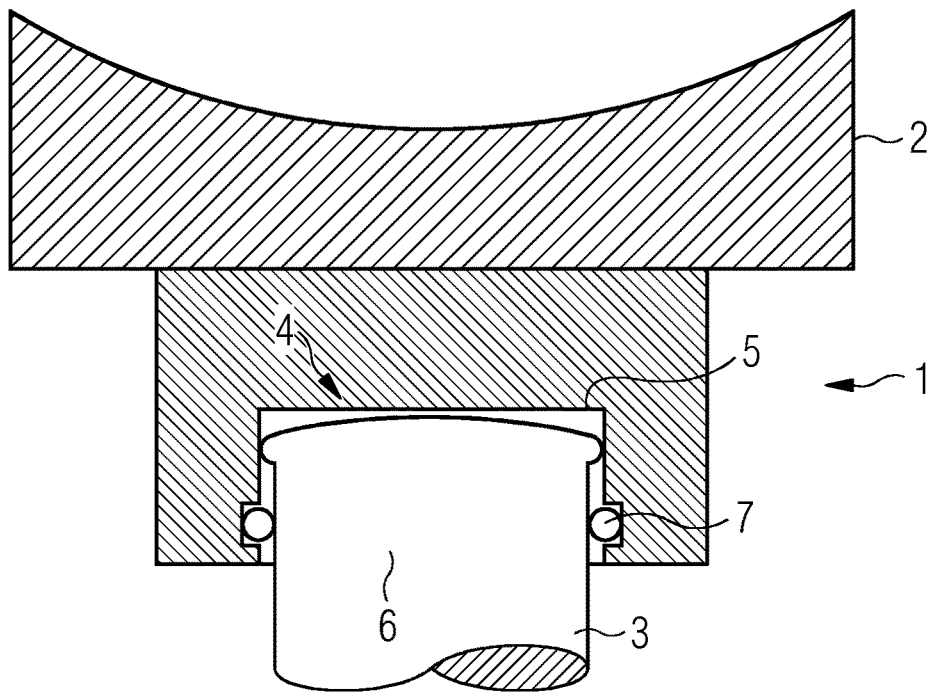

(51) Int. Cl.
*F16C 23/02* (2006.01)
*F16C 33/08* (2006.01)
*F16C 32/06* (2006.01)

(58) Field of Classification Search
USPC .................. 384/99, 117, 119, 312–313, 368
See application file for complete search history.

(56) References Cited

U.S. PATENT DOCUMENTS

| | | | |
|---|---|---|---|
| 4,073,549 A | | 2/1978 | Christ et al. |
| 4,228,571 A | | 10/1980 | Biondetti |
| 4,404,724 A | | 9/1983 | Christ et al. |
| 4,544,285 A | * | 10/1985 | Shapiro ................ B63H 23/321 384/306 |
| 4,858,292 A | * | 8/1989 | Buhlmann ............. D21G 1/022 492/7 |
| 4,913,563 A | * | 4/1990 | Veronesi ................... F04D 7/08 384/312 |
| 4,970,767 A | * | 11/1990 | Link ...................... D02J 13/005 492/7 |
| 5,215,384 A | * | 6/1993 | Maier ...................... F16C 17/03 384/117 |
| 5,967,957 A | * | 10/1999 | Kusters ............... F16C 32/0666 492/16 |
| 6,045,492 A | * | 4/2000 | Brendel ................ F16C 13/028 492/20 |
| 6,766,697 B1 | * | 7/2004 | Perez ...................... F16C 17/03 73/800 |
| 7,182,721 B2 | * | 2/2007 | van Haag ............. D21G 1/022 492/6 |
| 2002/0141670 A1 | * | 10/2002 | Nicholas ................. F16C 17/06 384/317 |
| 2012/0020598 A1 | * | 1/2012 | New ..................... F16C 17/035 384/122 |
| 2012/0099993 A1 | * | 4/2012 | Guerenbourg .......... F16C 35/02 416/174 |
| 2014/0133985 A1 | * | 5/2014 | Mongeau ................ F16C 25/02 416/95 |
| 2017/0045082 A1 | * | 2/2017 | Rockefeller ............ F16C 17/03 |

FOREIGN PATENT DOCUMENTS

| | | | |
|---|---|---|---|
| CN | 205173221 U | | 4/2016 |
| EP | 0840860 A1 | | 5/1999 |
| JP | 2001124062 A | * | 5/2001 ............. F16C 17/03 |
| JP | 2014152875 A | | 8/2014 |
| JP | 2016142313 A | * | 8/2016 ............. F16C 17/03 |
| WO | WO-2008049836 A2 | * | 5/2008 ............. E04H 9/021 |

OTHER PUBLICATIONS

Non-English Chinese Office Action for Application No. 201880018536. 2, dated Apr. 16, 2020.
John C Nicholas: "Tilting Pad Journal Bearings With Spray-Bar Blockers and Bypass Cooling for High Speed, High Load Applications Lund's Tilting Pad Journal Bearing Pad Assembly Method View project", Proceedings of the 32nd Turbomachinery Symposium, Sep. 1, 2003 (Sep. 1, 2003), pp. 27-37, XP055707653.
European Decision to Grant for Application No. 18701090.5, dated Jul. 23, 2020.

* cited by examiner

SLIDING BEARING PAD SUPPORT

CROSS-REFERENCE TO RELATED APPLICATIONS

This application claims priority to PCT Application No. PCT/EP2018/050035, having a filing date of Jan. 2, 2018, which is based off of DE Application No. 10 2017 204 410.1, having a filing date of Mar. 16, 2017, the entire contents both of which are hereby incorporated by reference.

FIELD OF TECHNOLOGY

The following relates to a support of a bearing pad of a sliding bearing.

BACKGROUND

Sliding bearings or plain bearings are known to be used in bigger machinery. Often these sliding bearings comprise bearing pads that comprise a sliding surface. Bearing pads are mounted to a bearing ring and are to a certain extent flexible, movable or tiltable in respect to the bearing ring.

These bearing pads can adapt to the tolerances in the bearing, to deformation and to other tolerances in operating conditions. The adjustment of their sliding surface adapts to the surface of the counterpart to be supported.

Therefore, the bearing pads need a freedom to move. In high dynamic events, like in bearings in wind turbines, the movement of the tilting pads can lead to unwanted movements of the bearing pads, including micro-movements, or high loads on the bearing pads that can lead to higher wear in the bearing.

SUMMARY

An aspect relates therefore to provide an improved connection of the bearing pad to the bearing ring.

A bearing pad support connection is disclosed comprising a bearing pad support for supporting a bearing pad. The bearing pad is connected to the bearing pad support by a pivot joint. The pivot joint comprises a pivot pocket and a pivot.

The bearing pad pivot pocket comprises a sealing that abuts on the pivot of the pivot joint.

A bearing pad is connected to a bearing pad support by a pivot joint. The pivot joint comprises a pivot pocket and a pivot. The pivot joint allows a pivot movement of the bearing pad in relation to the bearing pad support.

To limit the wear in the pivot joint, the pivot joint is lubricated by a lubricant. A sealing is present in the pivot pocket, whereby the sealing is in contact with the surface of the pivot in a way to seal the space present between the pivot pocket and the pivot.

Thus lubricant, present inside the pivot pocket to lubricate the pivot joint, is held back by the sealing and can't leave the pivot pocket in an uncontrolled manner. Thus, the lubricant will stay in the pivot joint, and will not flow out of the pivot joint. Thus, a pollution of the surrounding area with lubricant is avoided.

The bearing pad comprises the pivot pocket, and the bearing pad support comprises the pivot.

The pivot is connected to the bearing pad support in a way to allow the pivot to interact with the pivot pocket of the pivot joint.

The pivot pocket is arranged at the bearing pad in a way that the pivot pocket can interact with the pivot of the bearing pad support.

The pivot is connected to the bearing pad support at a side of the bearing pad support that is facing the bearing pad, when the pivot joint is connected. The pivot pocket is arranged at a surface of the bearing pad that is facing the bearing pad support when the pivot joint is connected.

The bearing pad comprises the pivot, and the bearing pad support comprises the pivot pocket.

The pivot pocket is arranged at the bearing pad support in a way that the pivot pocket can interact with the pivot of the bearing pad support.

The pivot is connected to the bearing pad in a way to allow the pivot to interact with the pivot pocket of the pivot joint.

The pivot is connected to the bearing pad at a side of the bearing pad that is facing the bearing pad support, when the pivot joint is connected. The pivot pocket is arranged at a surface of the bearing pad support that is facing the bearing pad when the pivot joint is connected.

The pivot comprises a neck and a head. The head comprises a rim with a wider dimension than the neck, and the sealing abuts on the neck of the pivot.

The bearing pad support connection comprises a pivot and the pivot comprises a neck and a head, whereby the head is connected to the neck, and the head forms an end of the pivot. The head of the pivot is located in the pivot pocket of the pivot joint, when the bearing pad support connection is connected.

The neck of the pivot reaches out of the pivot pocket. The sealing of the pivot pocket abuts on the neck of the pivot.

A dimension of the neck of the pivot can be, in the case of a more cylindrical neck, the diameter of the neck in a cross-cut perpendicular to the longitudinal axis, for example.

In the case of a more rectangular neck, a dimension of the neck can be the length of a side of the neck in a cross-section.

The head of the pivot has a wider dimension than the neck. Thus, the pivot shows a mushroom shape form.

During a pivot movement of the bearing pad in relation to the pivot, the sealing present in the pivot pocket slides along the surface of the neck.

The area of movement of the sealing along the neck of the pivot is limited by the head of the pivot.

The head of the pivot comprises a rounded outer surface at its longitudinal end. The pivot pocket comprises an inner surface facing the outer surface of the pivot. The largest radius of the outer surface of the pivot is smaller than the radius of the inner surface of the pivot pocket facing the pivot.

The head of the pivot is present at its longitudinal end. The head of the pivot is the end of the pivot pointing towards the counterpart of the pivot joint.

The head of the pivot comprises a rounded shape at its end, and the head comprises an outer surface.

The pivot pocket comprises an inner surface that is facing the outer surface of the pivot. To allow a movement of the pivot in the pivot pocket the largest radius of the outer surface of the pivot head needs to be smaller than a radius of the inner surface of the pivot pocket.

Thus, the pivot can move along the inner surface of the pivot pocket with its outer surface of the pivot head.

The sealing that abuts on the pivot defines a space that is limited by the pivot pocket and the pivot surrounding the pivot head.

The pivot pocket, or the pivot, comprises a duct to allow a fluid to enter the space between the pivot and the pivot pocket.

A certain space is defined by the inner surface of the pivot pocket and the outer surface of the pivot. The space is present between the pivot pocket and the pivot and is surrounding the pivot head. The space is limited by the sealing abutting on the neck of the pivot.

A duct is present in the bearing pad support connection that leads from the outside of the bearing pad support connection towards the space defined between the pivot pocket and the pivot head.

The duct allows a fluid to enter the space between the pivot pocket and the pivot head. The duct can be present in the bearing pad or it can lead through the pivot.

Thus, a lubricant can be pressed into the pivot joint and the pivot joint can be lubricated.

The fluid is oil that is applied through the duct to the space between the pivot and the pivot pocket to lubricate the pivot joint.

Oil can be used as a lubricant to be pressed into the space between the pivot pocket and the pivot head. The oil is used to lubricate the pivot joint to reduce the wear in the joint.

The oil can distribute itself in the space within the pivot pocket that is limited by the inner surface of the pivot pocket, the outer surface of the pivot head, the surface of the pivot neck, and is limited by the sealing. The sealing prevents the oil from leaving the pivot joint.

Thus, the lubrication of the pivot joint is optimized.

The pivot pocket with the sealing is movable in respect to the pivot in the direction of the longitudinal axis of the neck of the pivot.

Thus, the pivot joint comprises an additional degree of freedom, not only to perform the pivot movement, but to allow the bearing pad to move in a direction of the longitudinal axis of the pivot.

Thus, the bearing pad is more flexible in its reaction to loads.

Pressure is applied to the oil in the space between the pivot and the pivot pocket to preload the pivot joint and/or to apply a force to the bearing pad to push the bearing pad in the longitudinal direction of the pivot, in a way that the sealing advances along the neck of the pivot towards the head of the pivot.

A pressure is applied to the lubricant in the space between the inner surface of the pivot pocket and the outer surface of the pivot. The pressure of the lubricant forces to surfaces away from each other.

Thus, the bearing pad is forced away from the bearing pad support. The bearing pad moves in the direction of the longitudinal axis of the pivot.

Thus, the sealing slides along the neck of the pivot in the direction of the head of the pivot.

While the bearing pad increases the distance to the bearing pad support and the space in the pivot pocket fills with the oil, the inner surface of the pivot pocket and the outer surface of the pivot head are no longer in contact with each other but have a certain amount of oil in the distance between them.

When bearing pad experiences load, it will be pressed in the direction of the longitudinal axis of the pivot, towards the bearing pad support.

Peaks in the load, acting on the bearing pad, press the bearing pad towards the bearing pad support.

This increases the pressure in the oil, present in the space between the pivot pocket and the pivot. Thus, oil will be pressed out of the space.

Nevertheless, the inner surface of the pivot pocket and the outer surface of the pivot head are most of the time not in contact to each other, and thus the pivot head does only in rare occasions experience an impact on the surface of the pivot pocket.

Thus, the wear resulting from such an impact is reduced. The bearing pad can be preloaded by adding oil pressure to the pivot pocket, and peaks in the load or changes in the load on the bearing pad can be dampened by the oil present in the pivot pocket.

The sealing of the pivot pocket is prepared and arranged in a way to abut on the rim of the head of the pivot to limit the movement of the bearing pad along the length of the neck of the pivot.

The pivot comprises a mushroom shaped form with the head of the pivot protruding over the neck of the pivot.

When oil pressure is applied through the duct into the space between the pivot pocket and the pivot, the bearing pad moves in the direction of the longitudinal axis of the pivot. The space between the pivot pocket and the pivot increases and the sealing slides along the neck of the pivot towards the head of the pivot.

With an even further increasing pressure of the oil the sealing abuts on the head of the pivot and the movement of the bearing pad in the longitudinal direction of the pivot comes to a stop.

The pivot head is pressed against the sealing by the oil pressure and the space between the pivot head and the pivot pocket is even better sealed.

Thus, the movement of the bearing pad can be limited while the bearing is preloaded with oil pressure.

The use of a bearing pad support connection in a wind turbine is disclosed.

For bigger wind turbines it is advantages to use sliding bearings to support the main shaft of the rotor of the wind turbine. By preloading the bearing pads in the sliding bearing, wear in the pivot joints of the bearing pads is reduced.

Thus, the live time of the bearing pads is enhanced and the costs for service and maintenance and the exchange of the bearing pad are reduced.

A method is disclosed to operate a bearing pad support connection, whereby the bearing pad support connection comprises a bearing pad support for supporting a bearing pad. The bearing pad is connected to the bearing pad support by a pivot joint. The pivot joint comprises a pivot pocket and a pivot. The pivot pocket comprises a sealing that abuts on the pivot.

The method comprises the step of preloading the bearing pad support connection by applying fluid pressure to the space between the pivot and the pivot pocket. By applying fluid pressure, pressure is building up in the space between the pivot and the pivot pocket. The pressure forces the pivot pocket away from the pivot.

Loads acting at a bearing pad force the pivot pocket towards the pivot. An increase in the loads acting on the bearing pad, like load peaks, can be dampened by the fluid present in the space between the pivot pocket and the pivot.

The preload of the bearing pad can be regulated by the fluid pressure in the space between the pivot and the pivot pocket.

Thus the load on the pivot and the pivot pocket is reduced. Thus, also the wear of the pivot joint is reduced.

A method to operate a bearing pad support connection is disclosed, whereby the pivot comprises an outer surface at its longitudinal end, and the pivot pocket comprises an inner surface facing the outer surface of the longitudinal end of the pivot.

The method comprises the additional step of increasing the distance between the outer surface of the longitudinal end of the pivot, and the inner surface of the pivot pocket facing the longitudinal end of the pivot, by increasing the amount of fluid present in a space between the pivot and the pivot pocket.

Thus, the bearing pad can be lifted up in respect to the bearing pad support in the direction of the longitudinal axis of the pivot. The pressure of the fluid present in the pivot pocket can be adjusted to fit to the load on the pivot.

By applying a certain pressure to the fluid in the pivot pocket the distance between the outer surface of the pivot and the inner surface of the pivot pocket can be increased.

A load impact on the bearing pad is dampened by the fluid present in the pivot pocket.

Thus, it can be avoided that peak loads acting on the bearing pad are transferred undampened from the bearing pad over the pivot joint to the bearing pad support.

The fluid present in the pivot pocket acts as a cushion to dampen certain impacts of load on the bearing pad in respect to the bearing pad support. Thus, the wear on the pivot joint is reduced.

BRIEF DESCRIPTION

Figure 2:
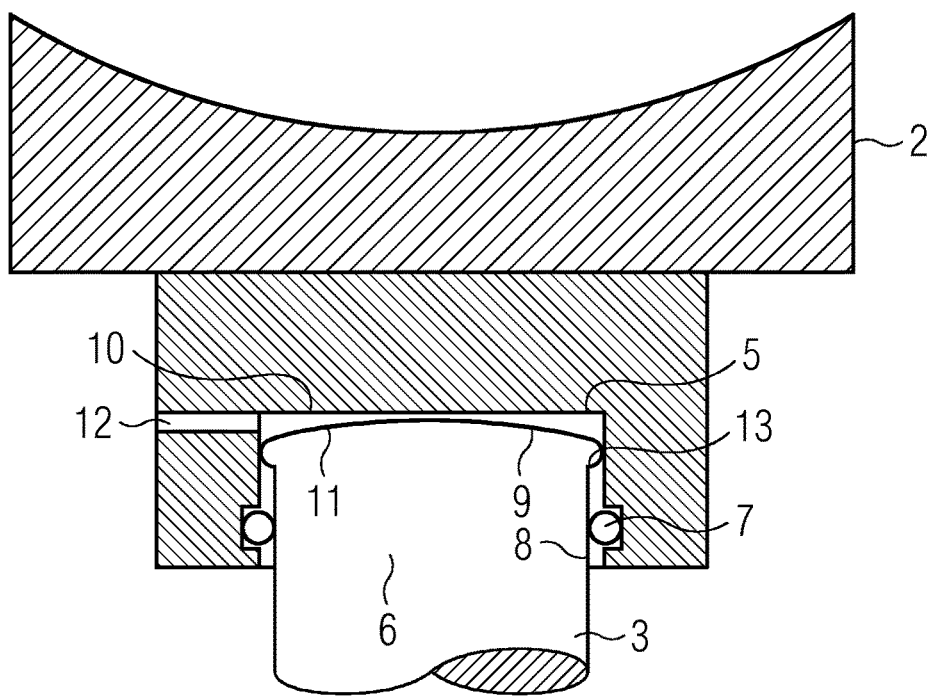

Some of the embodiments will be described in detail, with reference to the following figures, wherein like designations denote like members, wherein:

FIG. 1 shows a bearing support connection; and
FIG. 2 shows a further embodiment of the bearing pad support connection.

DETAILED DESCRIPTION

FIG. 1 shows a bearing support connection.
FIG. 1 shows a bearing pad support connection 1 comprising a bearing pad support 3 for supporting a bearing pad 2. The bearing pad support 3 is connected to the bearing pad 2 by a pivot joint 4. The pivot joint 4 comprises a pivot pocket 5 whereby the pivot pocket 5 is present in a part of the bearing pad 2.

The pivot joint 4 further comprises a pivot 6 that is located in the pivot pocket 5 when the bearing pad support connection 1 is connected. The bearing pad 2 can move in relation to the bearing pad support 3 by a movement in the pivot joint 4.

The pivot pocket 5 of the bearing pad 2 comprises a sealing 7. The sealing 7 abuts on the pivot 6 to seal the space present between the pivot 6 and the pivot pocket 5.

The space between the pivot 6 and the pivot pocket 5 can comprise a lubricant, for example, and the sealing 7 prevents that the lubricant present in the space between the pivot 6 and the pivot pocket 5 leaves the space in an uncontrolled manner.

FIG. 2 shows a further embodiment of the bearing pad support connection.

FIG. 2 shows a further embodiment of the bearing pad support connection 1. The bearing pad support connection 1 comprises a bearing pad support 3 for supporting a bearing pad 2. The bearing pad support 3 is connected to the bearing pad 2 by a pivot joint 4.

The pivot joint comprises a pivot pocket 5 present in a part of the bearing pad 2 and a pivot 6. The pivot 6 comprises a neck 8 and a head 9. The head 9 builds the end of the pivot 6. The head 9 comprises the area where the pivot 6 is in contact with the pivot pocket 5 when it performs a pivot movement on top of the pivot 6. The neck 8 of the pivot 6 carries the head 9.

The sealing 7 present in the pivot pocket 5 is in contact with the surface of the neck 8. The bearing pad 2 comprises a duct 12 that connects the pivot pocket 5 with the outside of the bearing pad 2. The duct 12 allows a fluid to enter or leave the pivot pocket 5.

The pivot pocket 5 comprises an inner surface 10. The head 9 of the pivot 6 comprises an outer surface 11. A fluid that is forced through the duct 12 into the pivot pocket 5 forces the inner surface 10 and the outer surface 11 apart from each other.

Thus, the space present between the inner surface 10 and the outer surface 11 will increase.

With an increasing distance between the inner surface 10 and the outer surface 11 the bearing pad 2 with the sealing 7 slides along the neck 8 of the pivot 6 towards the head 9. If further fluid is forced through the duct 12 and the space between the inner surface 10 and the outer surface 11 increases even further, the sealing 7 comes to arrest at the rim 13 of the head 9 of the pivot 6.

The movement of the bearing pad 2 along the pivot 6 stops when the sealing 7 comes to arrest at the rim 13. When the fluid is forced through the duct 12 into the room between the inner surface 10 and the outer surface 11, a pressure is build up in this room and thus the bearing pad support connection is preloaded.

When the bearing pad 2 is in use in a bearing the normal load present in the bearing acts in a direction to force the inner surface 10 towards the outer surface 11. The preload of the bearing pad forces the surfaces 10, 11 away from each other.

Thus, in the case of a peak load at the bearing pad the pressure in the room between the inner surface 10 and the outer surface 11 is increased and the fluid will be forced out of the duct 12, which leads to a movement of the bearing pad 2 towards the head 9 of the pivot 6. Only when the inner surface 10 touches the outer surface 11 peak loads are directly transferred from the bearing pad 2 towards the bearing pad support 3.

The illustration in the drawings is in schematic form. It is noted that in different figures, similar or identical elements are provided with the same reference signs.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A bearing pad support connection, comprising:
a bearing pad support for supporting a bearing pad;
wherein the bearing pad is connected to the bearing pad support by a pivot joint including a pivot pocket and a pivot,
wherein the pivot includes a neck and a head, the head includes a rim with a wider dimension than the neck, and the head further includes a rounded outer surface at a longitudinal end, wherein the pivot pocket includes a sealing that abuts on the neck of the pivot of the pivot joint, wherein the pivot pocket includes an inner surface facing the outer surface of the pivot, and wherein the largest radius of the outer surface of the pivot is smaller than a radius of the inner surface of the pivot pocket facing the pivot.

2. The bearing pad support connection according to claim 1, wherein pivot pocket is part of the bearing pad, and the pivot is part of the bearing pad support.

3. The bearing pad support connection according to claim 1, wherein the pivot is part of the bearing pad, and the pivot pocket is part of the bearing pad support.

4. The bearing pad support connection according to claim 1, wherein the sealing that abuts on the pivot defines a space that is limited by the pivot pocket and the pivot, surrounding the pivot head, and that the pivot pocket or the pivot includes a duct to allow a fluid to enter the space between the pivot and the pivot pocket.

5. The bearing pad support connection according to claim 4, wherein the fluid is oil, that is applied through the duct to the space between the pivot and the pivot pocket to lubricate the pivot joint.

6. The bearing pad support connection according to claim 5, wherein the pivot pocket with the sealing is movable in respect to the pivot in the direction of the longitudinal axis of the neck of the pivot.

7. The bearing pad support connection according to claim 6, wherein pressure is applied to the oil in the space between the pivot and the pivot pocket to at least one of preload pivot joint and to apply a force to the bearing pad to push the bearing pad in the longitudinal direction of the pivot in a way that the sealing advances along the neck of the pivot towards the head of the pivot.

8. The bearing pad support connection according to claim 7, wherein the sealing of the pivot pocket is arranged to abut on the rim of the head of the pivot to limit the movement of the bearing pad along the length axis of the neck of the pivot.

9. A use of the bearing pad support connection according to claim 1 in a wind turbine.

10. A method to operate a bearing pad support connection, wherein the bearing pad support connection comprises a bearing pad support for supporting a bearing pad, wherein the bearing pad is connected to the bearing pad support by a pivot joint, wherein the pivot joint includes a pivot pocket and a pivot, wherein the pivot includes a neck and a head, the head includes a rim with a wider dimension than the neck, and the head further includes a rounded outer surface at a longitudinal end, wherein the pivot pocket includes a sealing that abuts on the neck of the pivot, wherein the pivot pocket includes an inner surface facing the outer surface of the pivot, and wherein the largest radius of the outer surface of the pivot is smaller than a radius of the inner surface of the pivot pocket facing the pivot, the method comprising the step of preloading the bearing pad support connection by applying a fluid pressure to a space between the pivot and the pivot pocket.

11. The method to operate a bearing pad support connection according to claim 10, the method further comprising the step of increasing the distance between the outer surface at the longitudinal end of the pivot and the inner surface of the pivot pocket facing the longitudinal end of the pivot by increasing the amount of fluid present in the space between the pivot and the pivot pocket.

* * * * *